United States Patent
Rumer

(12)
(10) Patent No.: US 6,618,376 B2
(45) Date of Patent: Sep. 9, 2003

(54) ATM UTOPIA BUS SNOOPER SWITCH

(75) Inventor: Mark Rumer, Santa Barbara, CA (US)

(73) Assignee: Occam Networks, Santa Barbara, CA (US)

( * ) Notice: Subject to any disclaimer, the term of this patent is extended or adjusted under 35 U.S.C. 154(b) by 0 days.

(21) Appl. No.: 09/809,600

(22) Filed: Mar. 14, 2001

(65) Prior Publication Data

US 2002/0131433 A1 Sep. 19, 2002

(51) Int. Cl.$^7$ .................. H04L 12/28; H04L 12/56; G06F 15/16
(52) U.S. Cl. .................. 370/395; 370/402; 370/395; 370/413; 709/232
(58) Field of Search .................. 370/258, 395, 370/396, 402, 409, 420, 413, 469, 474, 230, 231, 257, 362, 449, 397; 709/232, 233, 235, 234

(56) References Cited

U.S. PATENT DOCUMENTS

| | | | | |
|---|---|---|---|---|
| 5,600,650 A | * | 2/1997 | Oskouy | 370/468 |
| 5,838,680 A | * | 11/1998 | Noiri et al. | 370/395 |
| 5,889,778 A | * | 3/1999 | Huscroft et al. | 370/395 |
| 5,898,688 A | * | 4/1999 | Norton et al. | 370/362 |
| 5,999,518 A | * | 12/1999 | Nattkemper et al. | 370/258 |
| 6,084,880 A | * | 7/2000 | Bailey et al. | 370/395 |
| 6,084,881 A | * | 7/2000 | Fosmark et al. | 370/397 |
| 6,243,382 B1 | * | 6/2001 | O'Neill et al. | 370/395 |
| 6,262,995 B1 | * | 7/2001 | Kwak | 370/469 |
| 6,343,077 B1 | * | 1/2002 | Chin et al. | 370/395 |
| 6,349,098 B1 | * | 2/2002 | Parruck et al. | 370/395 |
| 6,356,557 B1 | * | 3/2002 | Nichols et al. | 370/449 |

OTHER PUBLICATIONS

International Searching Authority; "International Search report"; PCT/US02/09200; Jun. 27, 2002.

* cited by examiner

Primary Examiner—Huy D. Vu
Assistant Examiner—M. Phan
(74) Attorney, Agent, or Firm—Blakely Sokoloff Taylor & Zafman LLP

(57) ABSTRACT

A communication bus snooper switch includes an inbound cell queue coupled to receive ATM cells from a number of ATM physical layer interfaces across a common inbound bus. An out-bound cell queue (which may be the same queue as the inbound cell queue when a dual port queue is used) is coupled to provide the ATM cells to separate ATM termination points according cell address information across separate out-bound busses. Each of the out-bound busses is associated with one of the ATM termination points. The snooper switch is configured to operate as an ATM bus master when communicating with the physical layer interfaces and as a ATM bus slave when communicating with the ATM termination points. During transmit operations, cells from the various ATM termination points are queued in corresponding transmission cell queues within the snooper switch and, thereafter, provided to the ATM physical layer interfaces according to an arbitration scheme implemented at the snooper switch.

14 Claims, 4 Drawing Sheets

ATM UTOPIA BUS SNOOPER SWITCH

FIELD OF THE INVENTION

The present invention is directed to a switch for use with ATM Utopia bus master and slave devices and finds particular application in implementations where multiple bus masters share connections with multiple bus slaves.

BACKGROUND

Asynchronous transfer mode (ATM) is a communication protocol which uses fixed length cells (packets) to transfer information between communication units. Typically, such cells are communicated between master and slave device across so-called Utopia busses, a well known bus standard. Such Utopia busses are commonly found in ATM communication units such as ATM switches and the like.

An example of an ATM switch is shown in FIG. 4, ATM switch 10 includes a number of line cards (1–M) 12, each of which have a number of ATM interfaces 14. The ATM interfaces 14 may be any communication medium adapted for carrying ATM cells, such as optical fiber communication links, wireless communication links or traditional wired communication links. Line cards 12 provide a variety of functions including connections/terminations for data interfaces and/or voice interfaces.

Line cards 12 are interconnected with one another across a backplane 16 through a switch core 18. Backplane 16 may be any of a variety of electrical interconnects including an ATM backplane or a backplane based on other communication protocols such as the well-known peripheral computer interconnect (PCI) communication bus. Switch core 18 operates to provide interconnection among the various line cards 12. Switch core 18 may be based upon a variety of technologies depending upon the manufacturer.

As indicated above, the line cards 12 may provide a variety of termination points for inbound ATM traffic from ATM interfaces 14. Not all of this traffic, however, will share common termination points. For example, voice information carried in ATM cells typically is terminated at one or more digital signal processors (DSPs). It is the function of the DSPs to reassemble time division multiplexed voice traffic from the plurality of ATM cells. Data traffic, on the other hand, often terminates at a ATM segmentation and reassembly (SAR) engine or other communication controller (e.g., a virtual network interface or other communication controller). Although these different traffic types have different termination points, traditional line card implementations generally route all inbound traffic from the ATM interfaces through a common bus structure. This presents a problem in that additional processor overhead is needed when routing voice traffic verses data traffic. Accordingly, it would be desirable to have a means at the line card level to allow for segregation of inbound traffic.

SUMMARY OF INVENTION

A communication bus snooper switch includes an inbound cell queue coupled to receive ATM cells from a number of ATM physical layer interfaces across a common inbound bus. An out-bound cell queue (which may be the same queue as the inbound cell queue when a dual port queue is used) is coupled to provide the ATM cells to separate ATM termination points according to cell address information across separate out-bound busses. Each of the out-bound busses is associated with one of the ATM termination points. The snooper switch is configured to operate as an ATM bus master when communicating with the physical layer interfaces and as an ATM bus slave when communicating with the ATM termination points. During transmit operations, cells from the various ATM termination points are queued in corresponding transmission cell queues within the snooper switch and, thereafter, are provided to the ATM physical layer interfaces according to an arbitration scheme implemented at the snooper switch.

In one embodiment the switch includes an inbound cell queue coupled to receive ATM cells from a number of ATM physical layer interfaces across a common inbound bus. An out-bound cell queue is coupled to provide the ATM cells to separate ATM termination points according to cell address information across separate out-bound busses. Each of the out-bound busses is associated with one of the ATM termination points. The switch is also configured to operate as an ATM bus master when communicating with the physical layer interfaces and as an ATM bus slave when communicating with the ATM termination points. The physical layer interfaces may be any appropriate interfaces such as ADSL modems and/or native ATM interfaces. The inbound and out-bound cell queues, which are found in the receive path, may be implemented as a single dual port queue using, for example, a dual port memory device.

The switch may further have an arbitrator configured to select the appropriate location within the inbound cell queue for a received ATM cell according to the physical layer interface from which the received ATM cell originates. In addition, one or more look-up tables may be provided, the look-up tables being configured to indicate which of the ATM termination points is to receive a cell stored in the inbound cell queue. In some cases, these look-up tables may be implemented as content addressable memories coupled to the inbound cell queue.

In addition, the switch may include a number of cell availability registers, each being associated with a respective one of the ATM termination points and being coupled to a respective one of the content addressable memories. And, in addition to a receive path, the switch may include a transmit path having a number of transmission cell queues, each corresponding to a respective one of the ATM termination points and being coupled to such corresponding respective ATM termination point. A multiplexer may then be used to couple the transmission cell queues to a common out-bound transmission bus coupled to the physical layer interfaces.

In a further embodiment, a communication interface (e.g., an ATM communication interface) is provided. The communication interface includes a first number of physical layer interfaces configured to act as bus slaves when transmitting and/or receiving communication units across a shared communication bus. The interface further includes a second number of communication termination points each configured to act as communication bus master when transmitting or receiving communication units across dedicated communication busses. Further, the interface includes a switch coupled between the physical layer interfaces and the communication termination points. The switch is configured to act as a communication bus master when exchanging communication units with the physical layer interfaces and as a communication bus slave when exchanging communication units with the communication termination points. In some cases, the communication units may be ATM cells, however, in general any packetized form of information may be used.

In some cases, the switch which is part of the communication interface may include a receive queue which is coupled to receive ATM cells or other communication units from the physical layer interfaces across the shared communication bus. The switch may further have a number of transmit queues each configured to receive communication units from respective ones of the communication termination points across a corresponding one of the dedicated communication busses. Preferably, but not necessarily, the receive queue and the transmit queues are all dual port queues.

The switch may be configured to notify one of the communication termination points when a cell for that communication termination point has been received into the receive queue. Such notification may be accomplished by setting a bit in a cell availability register corresponding to the respective termination point. Such a bit may be set in the cell availability register in response to the output of a look-up table, which may be implemented as a content addressable memory coupled to the receive queue.

These and other features of the present invention will be apparent from the detailed description and its accompanying drawings.

BRIEF DESCRIPTION OF THE DRAWINGS

The present invention is illustrated by way of example, and not limitation, in the figures of the accompanying drawings in which.

DETAILED DESCRIPTION

Described herein is an ATM Utopia bus snooper switch which may find application within line cards for ATM switches or other communication units. Although described with reference to the figures it should be kept in mind that these figures and the accompanying description are meant to be illustrative only and should not be read as limiting the more general spirit and scope of the present invention as set forth in the attached claims.

Figure 1:
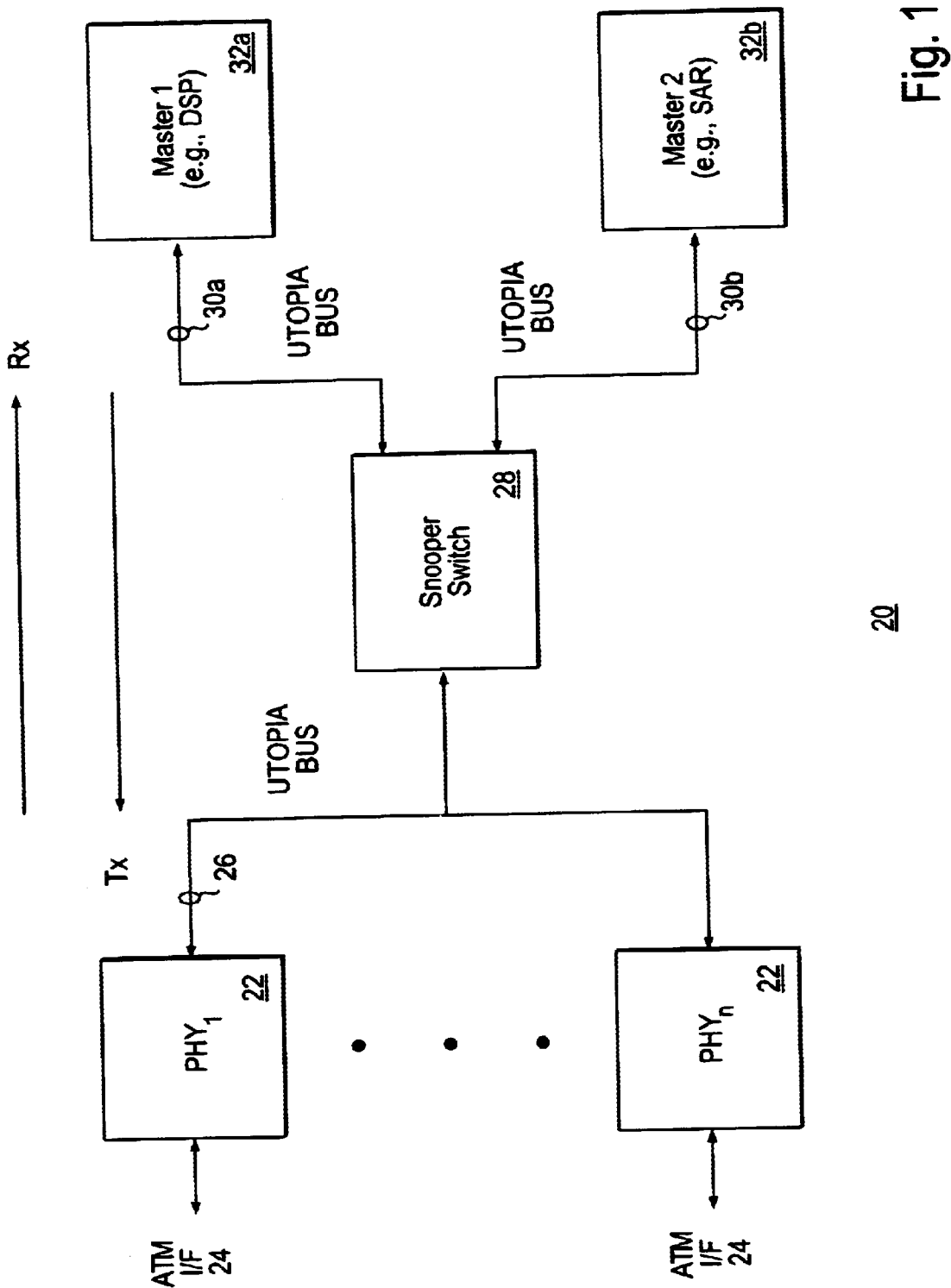
FIG. 1 illustrates one embodiment of an ATM communication interface having a number of physical layer interfaces and ATM communication units interconnected by a switch configured in accordance with the present invention.

Referring now to FIG. 1, various components of a communication interface 20 are illustrated. Communication interface 20 may, in one embodiment, be implemented as a line card or other communication interface for an ATM or other communication switch. Throughout this discussion, reference will be made to ATM communication units or cells, however, the principals of the present invention are equally applicable to any communication protocol employing similar communication units, such as packets and the like. Furthermore, references to the well-known ATM Utopia bus should not be read as limiting, in as much the principles of the present invention are applicable to any communication bus used to transport the above-described communication units or packets.

Communication interface 20 includes a number of physical layer interfaces 22, numbered 1–n. Physical layer interfaces 22 may be any such interface, including asynchronous digital subscriber line (ADSL) modems, and/or native ATM interfaces such as transmission conversion sublayers and the like. The physical layer interfaces 22 are each coupled to ATM interfaces 24, which interfaces may be any communication medium such as wired or wireless communication mediums and/or optical communication mediums. Physical layer interfaces 22 receive and transmit communication units (e.g., cells) across these ATM interfaces 24 when communicating with other physical layer interfaces associated with other communication devices.

The physical layer interfaces 22 share a common communication bus 26, which communication bus 26 in this example is implemented as the well-known ATM Utopia bus. Communication bus 26 transports (bi-directionally) cells and/or other communication units to and from the snooper switch 28 which is further described below. Snooper switch 28 acts as a communication bus master when communicating with the physical layer interfaces 22, which in turn act as communication bus slaves during such communications. For the case where communication bus 26 is the ATM Utopia bus, such master and slave communications are carried out in accordance with the Utopia bus protocol.

Snooper switch 28 is also communicatively coupled (e.g., via dedicated Utopia busses 30a and 30b), to communication termination points 32a and 32b. Communication termination point 32a and 32b may each be different types of communication terminations. For example, termination point 32a may be one or more digital signal processors, configured to process voice traffic received across one or more of the physical layer interfaces 22. Termination unit 32b may be one or more ATM segmentation and reassembly units, configured to process data traffic received across the physical layer interfaces 22. In each case, however, these termination units 32 act as communication bus master when communicating with snooper switch 28 across their dedicated communication busses 32a, 32b. Therefore, during such communications snooper switch 28 acts as a communication bus slave.

Figure 2:
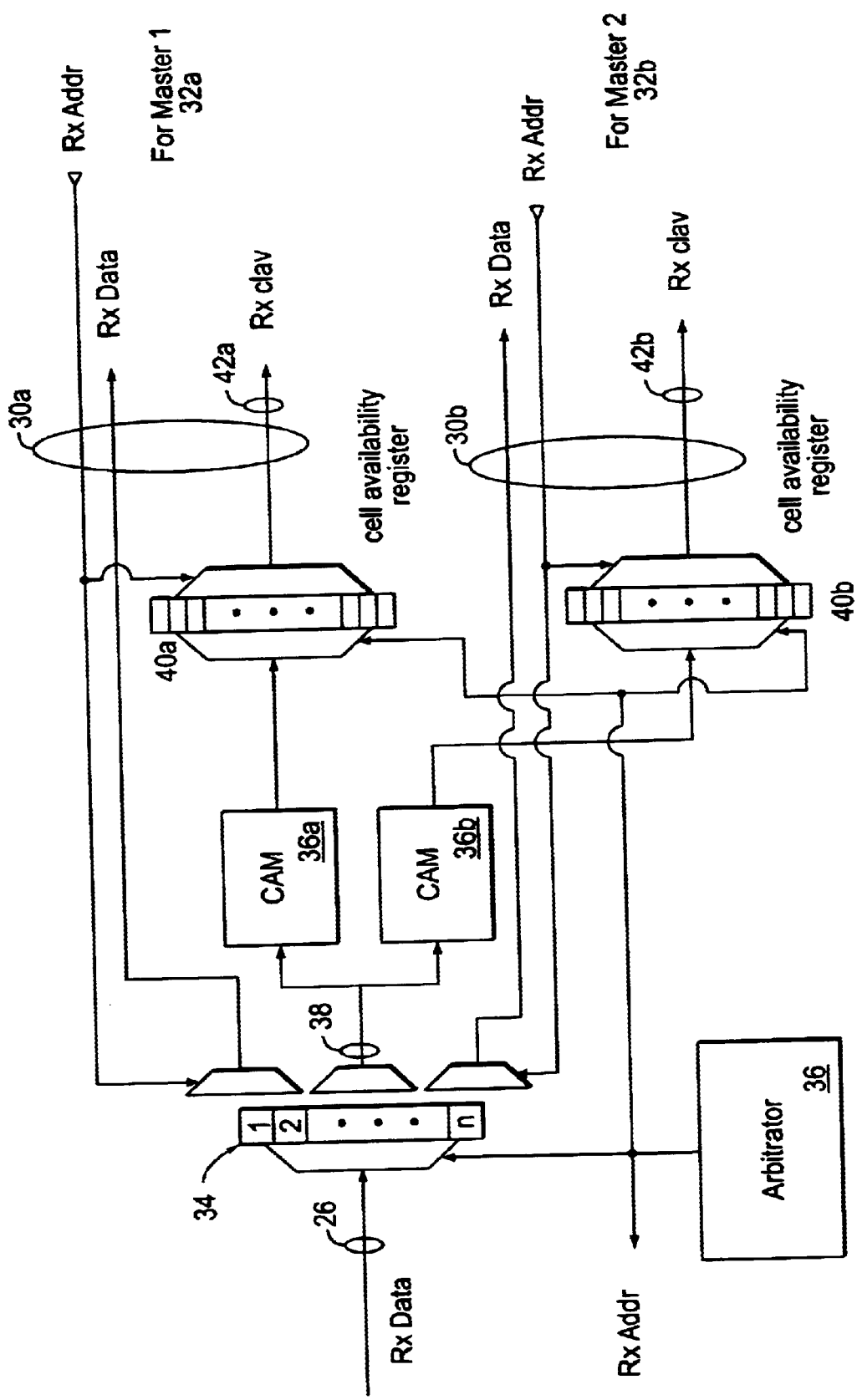
FIG. 2 illustrates one embodiment of a receive path for the switch shown FIG. 1.

Turning now to FIG. 2, further details of the snooper switch 28 are illustrated. In this diagram, components of the received path of snooper switch 28 are shown. Within snooper switch 28, inbound cells (or other communication units) are received across communication bus 26 into a receive queue 34. Receive queue 34 has "n" number of available slots, each corresponding to one of the physical layer interfaces 22. An arbitrator 36 polls the various physical layer interfaces 22 (e.g., according to a round-robin polling algorithm or other polling algorithm depending upon quality of service parameters for the various physical layer interfaces). When the physical layer interface indicates that it has cells available, the snooper switch 28 receives one of those cells into receive queue 34 in the position allocated for the corresponding physical layer interface 22.

As shown, receive queue 34 may be implemented as a dual port queue (e.g., a physical dual port random access memory) or in other embodiments may be implemented as two separate queues. Regardless of the implementation, however, the cells received in queue 34 will include header information. In the case of ATM cells, this header information will include a virtual channel identifier (VCI) and/or virtual path identifier (VPI). The VCI/VPI and physical layer interface number across which the cell was received are used as addressing information for a pair of content addressable memories (CAMs) 36a and 36b. This address information, which is passed on an address bus 38, is used to select an output of one (or both) of the content addressable memories 36. Thus, the CAMs 36 act as look-up tables.

The look-up tables each correspond to one of the ATM termination units 32. Thus, when a cell which is stored in one of the positions of received queue 34 is destined for termination unit 32a, a hit will be made in CAM 36a. That is, the address information of the cell of interest provided across bus 38 will index a location in CAM 36a such that the output of CAM 36a will set a bit in the cell availability register 40a associated with termination unit 32a. At the same time, the output of CAM 36b will record an indication in cell availability register 40b that indicates no cell at the corresponding point in cell receive register 34 is available for termination unit 32b. In this way, bits of the cell availability register 40a and 40b are set, or not, according to which positions in receive queue 34 contain cells for the corresponding termination units 32a and 32b.

The termination units 32a and 32b can thus separately receive indications of available cells across a receive cell availability line 42a or 42b, as appropriate, which lines are portions of the respective communication busses 30a and 30b. The cell availability indication informs the respective termination unit that cells corresponding to a particular physical layer interface 22 are available in receive queue 34. Thus, upon such indication, the termination unit is able access cells, independently from the other termination unit, by presenting a read address across communication bus 30a or 30b, as appropriate, and reading the corresponding cell data from receive queue 34. In this way, the termination units can separately poll their corresponding availability registers 40a and 40b and receive cell availability information accordingly. This will allow the termination units to separately receive inbound traffic from the corresponding physical layer interfaces 22.

As an alternative to the above, one could implement a separate receive queue for each termination unit 32. Of course, in such an implementation a separate buffer would need to be provided for a current cell to be processed, and then once processed that cell could be transferred to the appropriate one of the separate cell queues corresponding to each termination unit 32.

Figure 3:
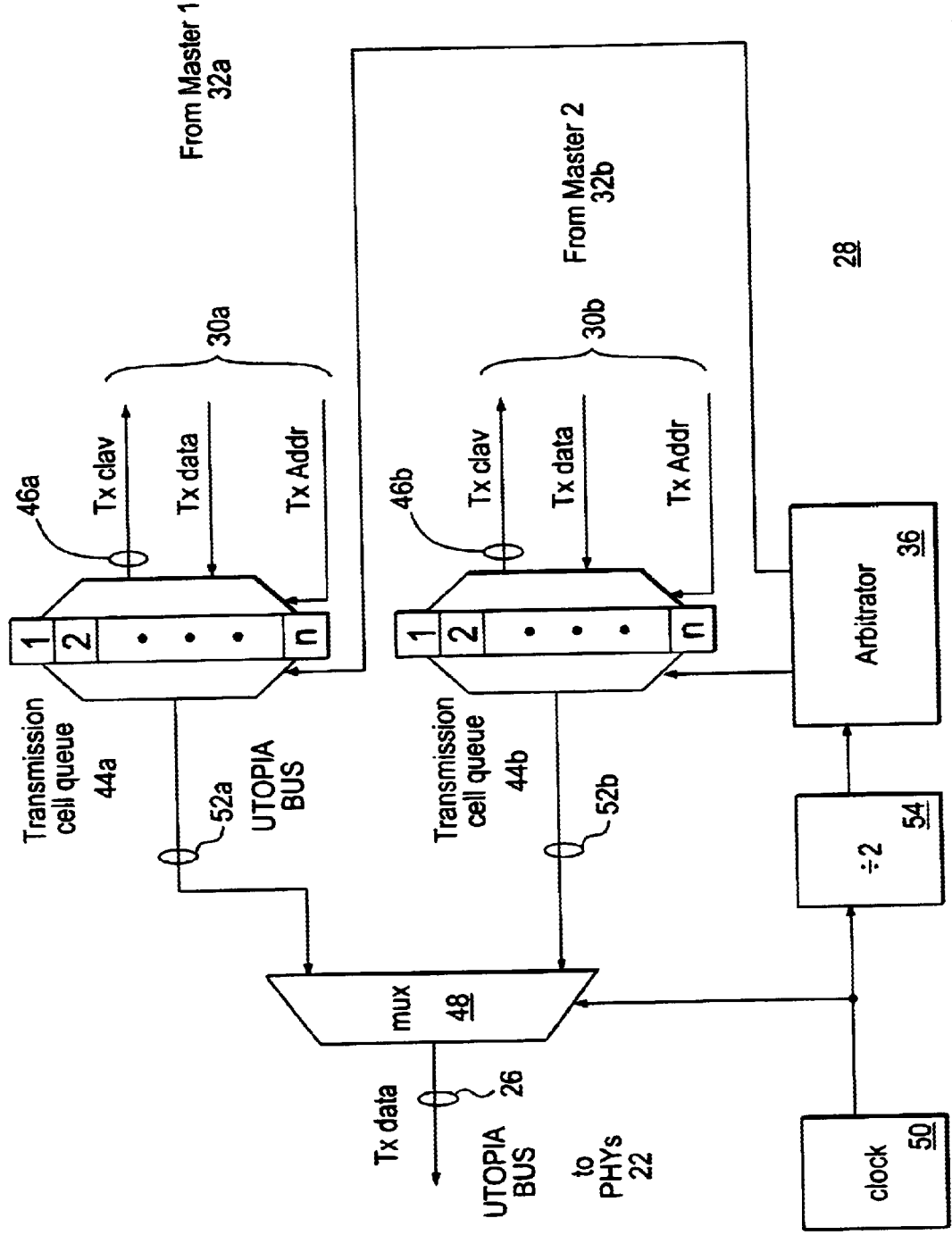
FIG. 3 illustrated one embodiment of a transmit path for the switch shown in FIG. 1.
Figure 4:
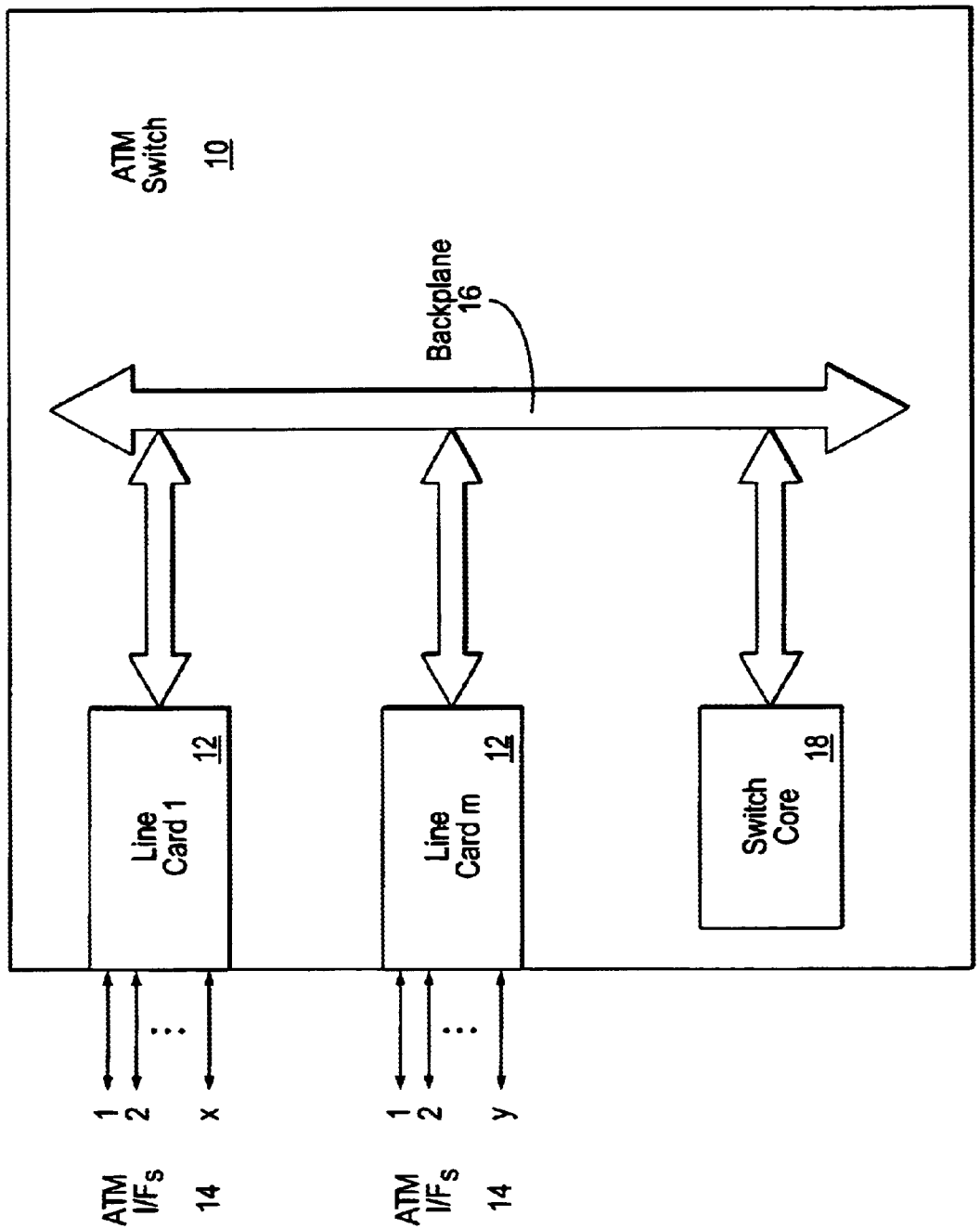
FIG. 4 illustrates functional components of a conventional ATM switch.

Now turning to FIG. 3, the transmit path for the snooper switch 28 is illustrated. The transmit path includes transmission cells queues 44a and 44b, each corresponding to a respective one of the termination units 32a and 32b. The transmission cell queues each have "n" positions, each position corresponding to one of the physical layer interfaces 22. Thus, when termination unit 32a has data to transmit across one of the physical layer interfaces, that termination unit polls the snooper switch 28 to see if space is available in its corresponding transmission cell queue 44. When an indication of an available space is shown (e.g., across a transmission cell available line 46), the termination unit 32 transmits the appropriate cell information into the corresponding slot of the transmission cell queue 44.

The data to be transmitted (i.e., the cell) is then passed across communication bus 30 and is organized into an appropriate slot in transmission cell queue 44 according to the address information provided by the termination unit 32, which address information is used to index the appropriate location in transmission cell queue 44. From transmission cell queue 44, the data is transmitted out to the appropriate physical layer interface 22 via multiplexer 48, again according to a transmission arbitration scheme implemented by an arbitrator 36.

In some cases, this transmission arbitration scheme may be round-robin in as much as the arbitrator first determines whether cells from termination unit 32a are destined for physical layer interface 1 and, if not, whether cell termination unit 32b are destined for physical layer interface 1, and so on until cells are transmitted to the appropriate physical layer interface. Of course, other arbitration schemes could be implemented, for example, various quality of service arbitration schemes could be implemented uses other polling algorithms.

A clock 50 is used to select between busses 52a and 52b to allow for the transmission of cells from queues 44a and 44b, respectively. The same clock signal may be provided, via a divide by 2 unit 54, to the arbitrator to allow for the implementation of the round-robin polling scheme.

Thus, the above-described snooper switch 28 operates as both a bus master and bus slave when communicating with the physical layer interfaces and the termination units respectively. The addition of the snooper switch 28 in the communication path allows a single group of physical layer devices to be shared among several communication masters (and not merely the two shown in the above described figures) and thus may allow for parallel processing of cells. In one embodiment, this arrangement will allow for separate processing of voice and data communication units. However, it should also be kept in mind that the present invention is not limited to such embodiments and should only be so limited in terms of the claims that follow.

What is claimed is:

1. A switch, comprising:
   an inbound cell queue coupled to receive ATM cells from a number of ATM physical layer interfaces across a common inbound bus;
   an outbound cell queue coupled to provide the ATM cells to separate ATM termination points according to cell address information across separate outbound busses, each outbound bus being associated with one of the ATM termination points; and
   one or more content addressable memeory's coupled to the inbound cell queue, the one or more content addressable memory's being configured to indicate which of the ATM termination points is to receive a cell stored in the inbound cell queue,
   wherein the switch is configured to operate as an ATM bus master when communicating with the physical layer interfaces and as an ATM bus slave when communicating with the ATM termination points.

2. The switch of claim 1 wherein one or more of the physical layer interfaces comprise an asynchronous digital subscriber line (ADSL) modem.

3. The switch of claim 1 wherein one or more of the physical layer interfaces comprise a native ATM interface.

4. The switch of claim 1 wherein the switch is implemented at a line card of an ATM communication unit.

5. The switch of claim 1 wherein the inbound cell queue and the outbound cell queue are implemented as a single dual port queue.

6. The switch of claim 1 further comprising an arbitrator configured to select an appropriate location within the inbound cell queue for a received ATM cell according to the physical layer interface from which the received ATM cell originates.

7. The switch of claim 1 further comprising a number of cell availability registers, each being associated with a respective one of the ATM termination points and being coupled to a respective one of the CAMs.

8. The switch of claim 1 further comprising a number of transmission cell queues, each corresponding to a respective one of the ATM termination points and being coupled to such corresponding respective ATM termination point.

9. The switch of claim 1 further comprising a multiplexer coupled to the transmission cell queues and to a common transmission bus coupled to the physical layer interfaces.

10. A communication interface, comprising:

a first number of physical layer interfaces configured to act as bus slaves when transmitting and/or receiving ATM cells across a shared communication bus;

a second number of communication termination points each configured to act as a communication bus master when transmitting or receiving ATM cells across dedicated communication buses; and a switch coupled between the physical layer interfaces and the communication termination points and configured to act as a communication bus master when exchanging ATM cells with the physical layer interfaces and as a communication bus slave when exchanging ATM cells with the communication termination points, wherein the switch comprises a receive queue coupled to receive ATM cells from the physical layer interfaces across the shared communication bus, wherein the switch is configured to notify one of the communication termination points when a cell for that communication termination point has been received in to the receive queue by setting a bit in a cell availability register corresponding to the one of the communication termination points for which the cell has been received.

11. The communication interface of claim 10 wherein the switch further comprises a number of transmit queues each configured to receive ATM cells from a respective one of the communication termination points across a corresponding one of the dedicated communication buses.

12. The communication interface of claim 11 wherein the receive queue and the transmission queues are all dual port queues.

13. The communication interface of claim 10 wherein the bit in the cell availability register is set in response to the output of a content addressable memory (CAM) coupled to the cell availability register and the receive queue.

14. The communication interface of claim 10 wherein the communication interface comprises a line card of an ATM switch.

* * * * *